(12) United States Patent
Chen et al.

(10) Patent No.: US 7,149,855 B2
(45) Date of Patent: Dec. 12, 2006

(54) NETWORK ATTACHED MEMORY AND IMPLEMENTATION THEREOF

(75) Inventors: Tianlong Chen, Gaithersburg, MD (US); Jonathan Vu, Fairfax, VA (US); Yingbin Wang, Falls Church, VA (US)

(73) Assignee: Intelitrac, Inc., Rockville, MO (US)

( * ) Notice: Subject to any disclaimer, the term of this patent is extended or adjusted under 35 U.S.C. 154(b) by 204 days.

(21) Appl. No.: 10/763,889

(22) Filed: Jan. 23, 2004

(65) Prior Publication Data

US 2004/0151018 A1 Aug. 5, 2004

Related U.S. Application Data

(63) Continuation of application No. 10/347,677, filed on Jan. 22, 2003.

(51) Int. Cl.
*G06F 12/00* (2006.01)
*G06F 13/00* (2006.01)
(52) U.S. Cl. ............... 711/154; 711/100; 711/141; 711/146
(58) Field of Classification Search ........ 711/141–146, 711/100, 154
See application file for complete search history.

(56) References Cited

U.S. PATENT DOCUMENTS

| 5,237,661 | A | | 8/1993 | Kawamura et al. |
|---|---|---|---|---|
| 5,404,482 | A | * | 4/1995 | Stamm et al. ............... 711/145 |
| 5,809,495 | A | | 9/1998 | Loaiza |
| 5,914,727 | A | * | 6/1999 | Horan et al. ................ 345/503 |
| 6,105,024 | A | | 8/2000 | Graefe et al. |
| 6,199,141 | B1 | | 3/2001 | Weinreb et al. |
| 6,304,867 | B1 | | 10/2001 | Schmidt |
| 2002/0156973 | A1 | * | 10/2002 | Ulrich et al. ............... 711/114 |

OTHER PUBLICATIONS

TimesTen Performance Software White Paper, "Architected for Real-Time Data Management—TimesTen's Core In-Memory Database Technology," TimesTen Performance Software 2001, pp.

* cited by examiner

*Primary Examiner*—Tuan V. Thai
(74) *Attorney, Agent, or Firm*—24IP Law Group; Timothy R. DeWitt

(57) ABSTRACT

A Distributed Memory Computing Environment (herein called "DMCE") architecture and implementation is disclosed in which any computer equipped with a memory agent can borrow memory from other computer(s) equipped with a memory server on a distributed network. A memory backup and recovery as an optional subsystem of the Distributed Memory Computing system is also disclosed. A Network Attached Memory (herein called "NAM" or "NAM Box" or "NAM Server") appliance is disclosed as a dedicated memory-sharing device attached to a network. A Memory Area Network (herein called "MAN") is further disclosed, such a network is a network of memory device(s) or memory server(s) which provide memory sharing service to memory-demanding computer(s) or the like, when one memory device or memory server fails, its service will seamlessly transfer to other memory device(s) or memory server(s).

30 Claims, 21 Drawing Sheets

Prior-art Computing Environment

Distributed Memory Computing Environment

NETWORK ATTACHED MEMORY AND IMPLEMENTATION THEREOF

CROSS-REFERENCE TO RELATED APPLICATIONS

This application is a continuation of U.S. patent application Ser. No. 10/347,677, filed on Jan. 22, 2003, and entitled "Distributed Memory Computing Environment and Implementation Thereof", and claims the benefit of the filing date of that application.

Related Application: Memory-Resident Database Management System and Implementation Thereof; Filed on Jan. 22, 2003; Ser. No. 10/347,678; Inventors: Tianlong Chen, Jonathan Vu.

STATEMENT REGARDING FEDERALLY SPONSORED RESEARCH OR DEVELOPMENT

Not applicable.

FIELD OF THE INVENTION

The present invention relates to Distributed Memory Computing Environments and more particularly to a system and method of sharing Random Access Memory or the like in a distributed computing environment and the implementation of such system and method.

BACKGROUND OF THE INVENTION

Throughout the evolution of computers, CPUs have become faster and faster and hard disks have become bigger and bigger. Although Random Access Memory (RAM) likewise has become bigger and bigger, the RAM available to the computer nevertheless has almost always been less than the amount needed. No matter how much RAM has been installed in a computer, physical limitations and costs have restricted RAM needs from being satisfied in most computing environments. To compensate for insufficient RAM, most systems swap files between the RAM and a storage device such as a hard disk drive. More RAM often means faster computing in the same CPU environment, which avoids swapping from happening between RAM and disk-based swap files.

In view of the insufficiency of the RAM typically available in a system, the present invention provides a system in which one can borrow RAM from somewhere when it is needed and release it when it is not needed. In this manner, RAM deficiencies may be overcome and costs may be saved by making the RAM sharable for multiple users.

SUMMARY OF THE INVENTION

The present invention as disclosed and claimed herein is a method of Distributed Memory Computing, a Distributed Memory Computing Environment (DMCE) architecture, a Network Attached Memory (NAM) device, a method of using a Network Attached Memory device, a Memory Area Network (MAN) architecture, and a method of using a Memory Area Network.

In still another aspect of the disclosed embodiment, a method of a virtual memory address scheme to provide large addressable memory across a network and a mapping method between an underlying Operating System virtual memory address and a DMCE virtual memory address is disclosed.

In still another aspect of the disclosed embodiment, a method of embedding network information in a DMCE virtual memory address is disclosed.

In still another aspect of the disclosed embodiment, a method and apparatus for memory-to-memory and memory-to-disk backup and recovery is disclosed.

In still another aspect of the disclosed embodiment, a Network Attached Memory device or server architecture and a method of using the device or server is disclosed. Such device or server will provide memory-sharing services to other computing devices.

In still another aspect of the disclosed embodiment, an apparatus and method of a Memory Cache mechanism is disclosed to provide virtual memory access on a memory-borrower device (called a Memory Client).

In still another aspect of the disclosed embodiment, an apparatus and method of a Memory Area Network is disclosed to provide high fault tolerance and more memory sharing services to memory borrowers.

In still another aspect of the disclosed embodiment, a method of a memory sharing messaging protocol (called "MSMP") is disclosed to provide a networked or in-server communication mechanism between a memory client and a memory server in the process of memory sharing.

In still another aspect of the disclosed embodiment, an apparatus and method of a Memory Switch device for providing dispatching and routing service of a memory request to the Memory Area Network is disclosed.

In still another aspect of the disclosed embodiment, a method of a memory-to-memory failure tolerance mechanism is disclosed to provide hard-disk-RAID-like functionality on memory base.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention.

Accordingly, the drawings and descriptions are to be regarded as illustration in nature, and not as restrictive.

BRIEF DESCRITION OF THE DRAWINGS

For a more complete understanding of the present invention and the advantages thereof, reference is now made to the following description and the accompanying drawings, in which.

DETAILED DESCRIPTION OF INVENTION

Figure 1A:
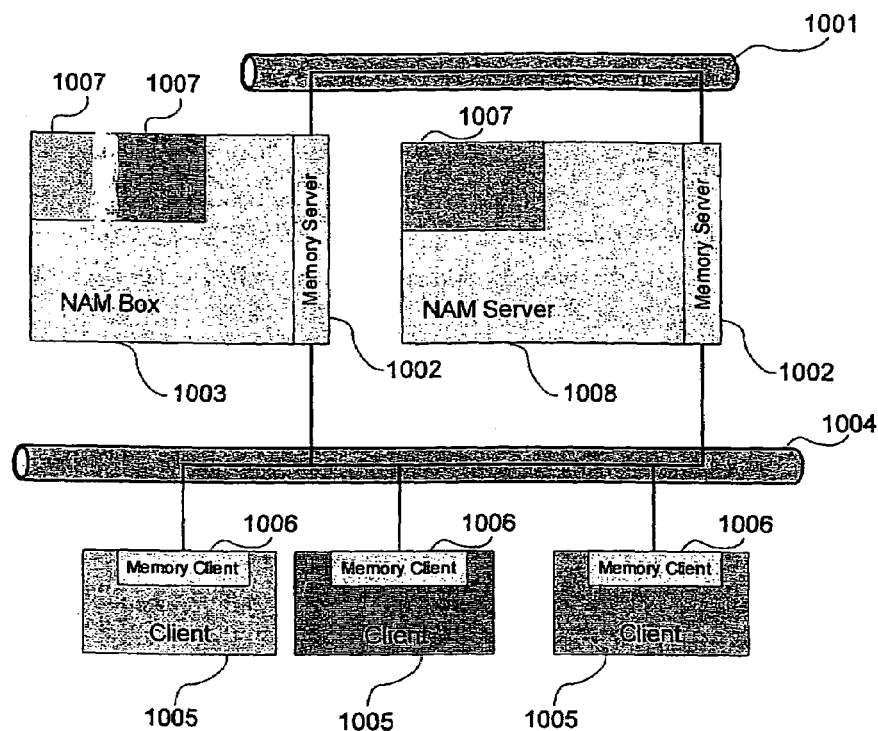
FIG. 1A illustrates a conceptual block diagram of an embodiment of a Distributed Memory Computing Environment of the present invention.

Referring to FIG. 1A, there is illustrated block diagram of an embodiment of a basic Distributed Memory Computing Environment (DMCE) architecture of the present invention. Clients 1005 are devices needing memory, e.g., a computer, a server, or the like, in which particularly, applications run on Clients 1005 may need more memory. The word "memory" refers to sources of Random Access Memory, or chip-based memory. Clients 1005 access networked memory 1007. Networked memory 1007 resides on various devices. In the embodiment of FIG. 1A, networked memory 1007 on a Network Attached Memory (NAM) Box (or called appliance) 1003 and a Network Attached Memory (NAM) Server 1008 is illustrated (NAM Box, NAM Server may be exchangeable, see explanation below). In order for memory sharing to be possible, Memory Client 1006 is installed on each of Clients 1005 which desires to borrow memory. A Memory Server 1002 on each NAM Box 1003 or NAM Server 1008 exists. The Memory Client 1006 and Memory Server 1002 applications work together to provide the functionality to control the memory management, memory sharing and network connection control needed to share memory. Memory Server 1002 provides functionality as described in related patent application Memory-Resident Database Management System and implementation thereof, hereby incorporated by reference. A Client network 1004 connects memory borrowers (Memory Clients 1006) with memory lenders (Memory Servers 1002). This Client Network 1004 preferably is a high-speed network, for example, a fiber optic or Gigabit Ethernet. However, current Ethernet networks may be used. Network 1001 is an optional network that provides a backend network for NAM devices, such as NAM Box 1003 or NAM Server 1008, to communicate with each other for providing backup, recovery and other processing related functions to the Memory Server 1002. One can use the Client Network 1004 to do the same functionality, however the latter method is only preferred when overall memory sharing network traffic is not high compared to the maximum capacity of the Client Network 1004. Further, the NAM Box and NAM server in this embodiment could be combined into a single unit, in which case Network 1001 would not be used.

Memory sharing not only can happen in a network environment, but also can happen within a server (or any computer). Such situation often happens on 32-bit (or other lower-than-32-bit) Operating System (OS). The 32-bit operating system has a maximum addressable memory of 4 GB. The usable user-space memory is often approximately 3 GB, depending on the type of OS used, due to memory management overhead of an Operating System kernel. Thus, approximately 3 GB of RAM are available and often goes unused.

Figure 1B:
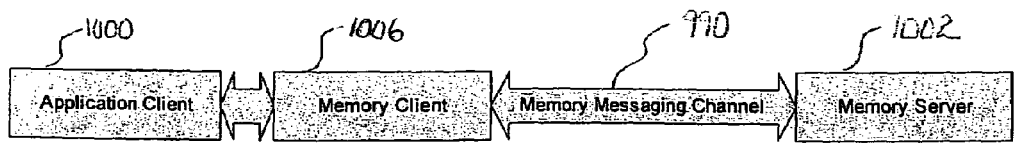
FIG. 1B illustrates a conceptual block diagram of an abstract basic Distributed Memory Computing Environment of the present invention.

FIG. 1B illustrates a conceptual block diagram of the abstract basic Distributed Memory Computing Environment. Application Client 1000 and Memory Client 1006 reside in a Client 1005 (not illustrated), for example, a computer, desiring to borrow memory. Requests to borrow memory are sent through a Memory Messaging Channel 990 through client network 1004. The Memory Messaging Channel 990 provides communications between a Memory Client 1006 and a Memory Server 1002.

Figure 1C:
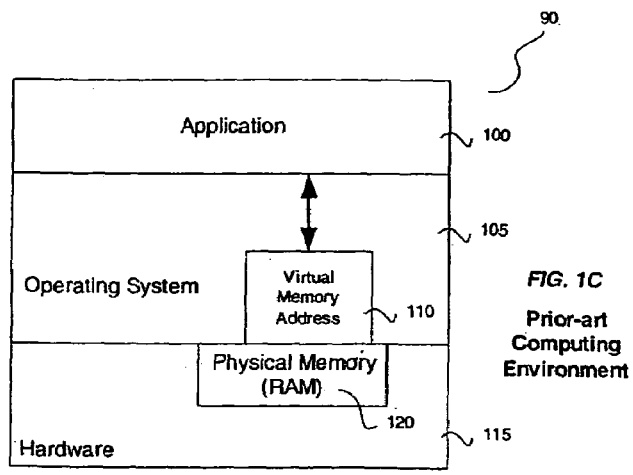
FIG. 1C illustrates an embodiment of a prior art computing environment as a comparison in helping understand the present invention.

FIG. 1C illustrates an embodiment of a prior art computing environment as comparison to help understanding the present invention. In the internal computing environment of the prior art environment 90, various computer applications 100, e.g., Oracle®, run through a computer operating system 105. The computing environment includes various hardware 115, including Physical Memory (RAM) 120. The operating system 105 includes a Virtual Memory Address Table 110 used to interface with RAM for storing instructions and data when executing application and operating system programs.

In a 32 bit operating system, virtual memory address tables can recognize up to 4 Gigabytes of RAM internally.

Figure 1D:
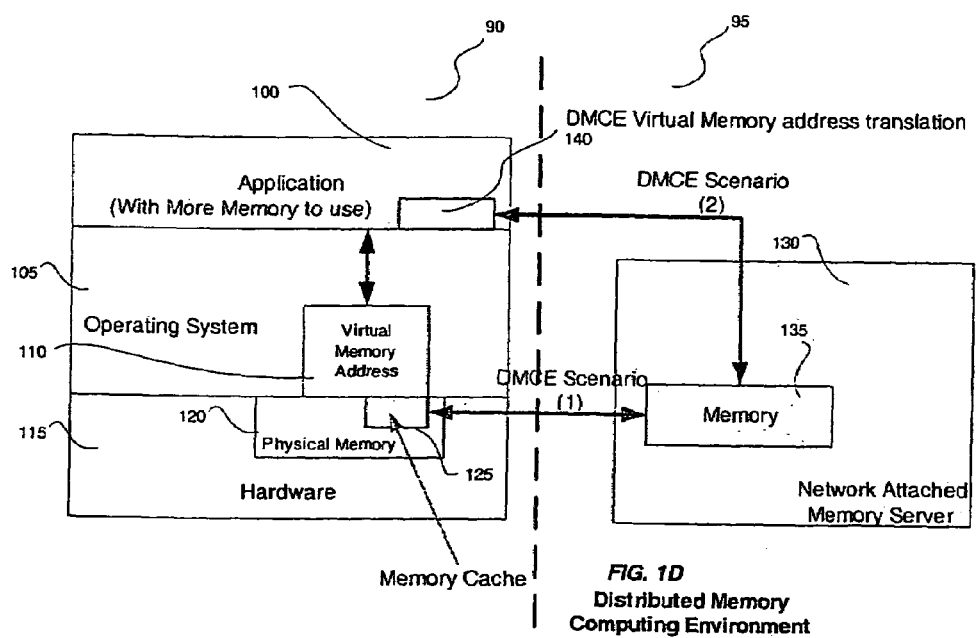
FIG. 1D illustrates an embodiment of a Distributed Memory Computing Environment of the present invention.

FIG. 1D illustrates a distributed computing environment. A distributed computing environment (DMCE) allows networked memory 135 can be sharable for other client devices 115. The external computing environment 95 includes a Memory Server 130 including a memory management unit 135. Two DMCE scenarios are shown in FIG. 1D. One scenario is to modify the virtual address handling table 110 and logic to recognize not only internal memory but also the networked memory 135 through memory cache 125. The other scenario is for the application 100 by directly using the DMCE virtual memory address scheme, which is disclosed in FIGS. 8, 9 and 10, to directly make networked memory 135 addressable.

Figure 8:
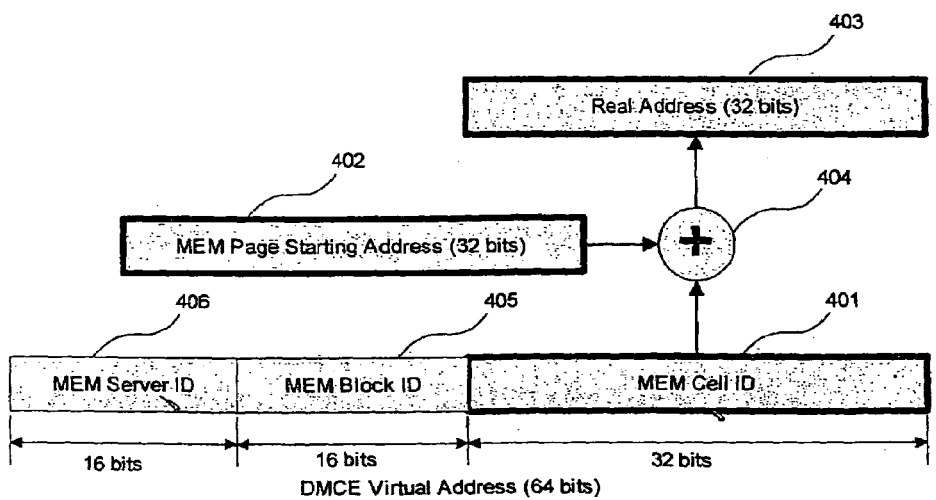
FIG. 8 illustrates a conceptual block diagram of a Virtual Address scheme for a 32-bit Operating System in accordance with an embodiment of the present invention.
Figure 9:
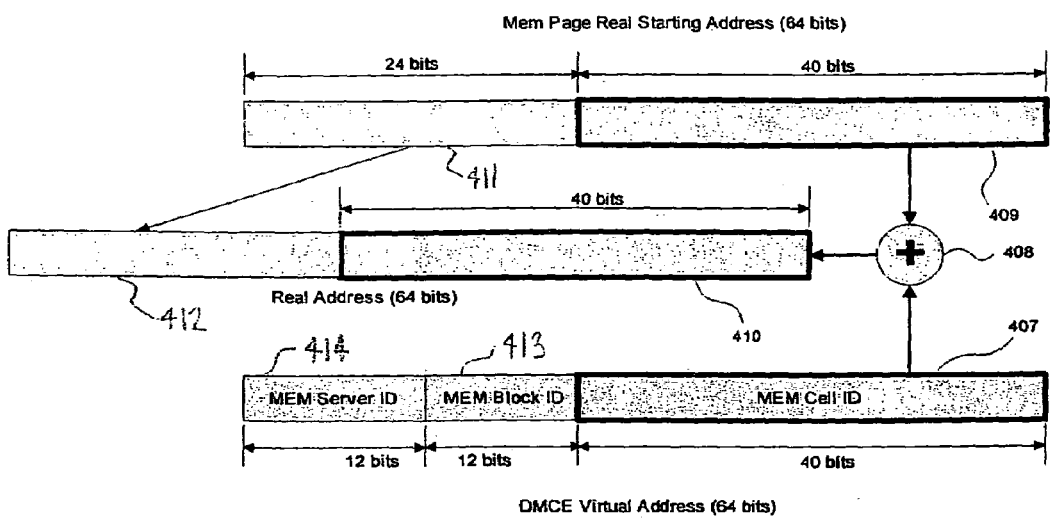
FIG. 9 illustrates a conceptual block diagram of a Virtual Address scheme for a 64-bit Operating System in accordance with an embodiment of the present invention.

In order to access more addressable memory than a normal Operating System can provide, a DMCE Virtual Address scheme is described. FIG. 8 illustrates a DMCE Virtual Address scheme for a 32-bit Operating System, and FIG. 9 illustrates a DMCE Virtual Address scheme for a 64-bit Operating System. Both the 32-bit and 64-bit address schemes include a 64-bit address including three portions: a Memory Server Index (called "MEM Server ID"), a Memory Block Index (called "MEM Block ID") and a Memory Offset Index (called "MEM Cell ID").

Referring to FIG. 8, the MEM Cell ID 401 is lowest 32-bit portion in a DMCE Virtual Address in a 32-bit Operating System. The MEM Server ID 406 and the MEM Block ID 405 are 16-bit each respectively as illustrated in FIG. 8; however, they do not have to be 16-bits each, they are configurable.

Referring to FIG. 9, the MEM Cell ID 407 is lowest 40-bit portion in a DMCE Virtual Address in a 64-bit Operating System, and the number of bits of this portion is also configurable and normally Operating System dependent. The MEM Server ID 414 and the MEM Block ID 413 are 12-bit each, as illustrated in FIG. 9; however, they do not have to be those numbers of bits and they are configurable.

Referring to FIGS. 8, 9, and ID, the MEM Cell ID is the memory offset of an underlying virtual or physical address If a DMCE application 140 builds above OS kernel 105, the underlying address 403, 409 is a virtual address. If DMCE builds inside the OS kernel, the underlying address 403, 409 may be a physical address. This addressing structure is referred to as "configurable" because a group of addresses may be effectively re-mapped by changing only the mapping of a server ID or block ID corresponding to that group of data. This configurable structure makes it easy to copy a block of memory content that may include memory addressing inside, from one server to another without losing address accessibility. Building DMCE above the OS kernel or inside the OS kernel is further described below.

Figure 10:
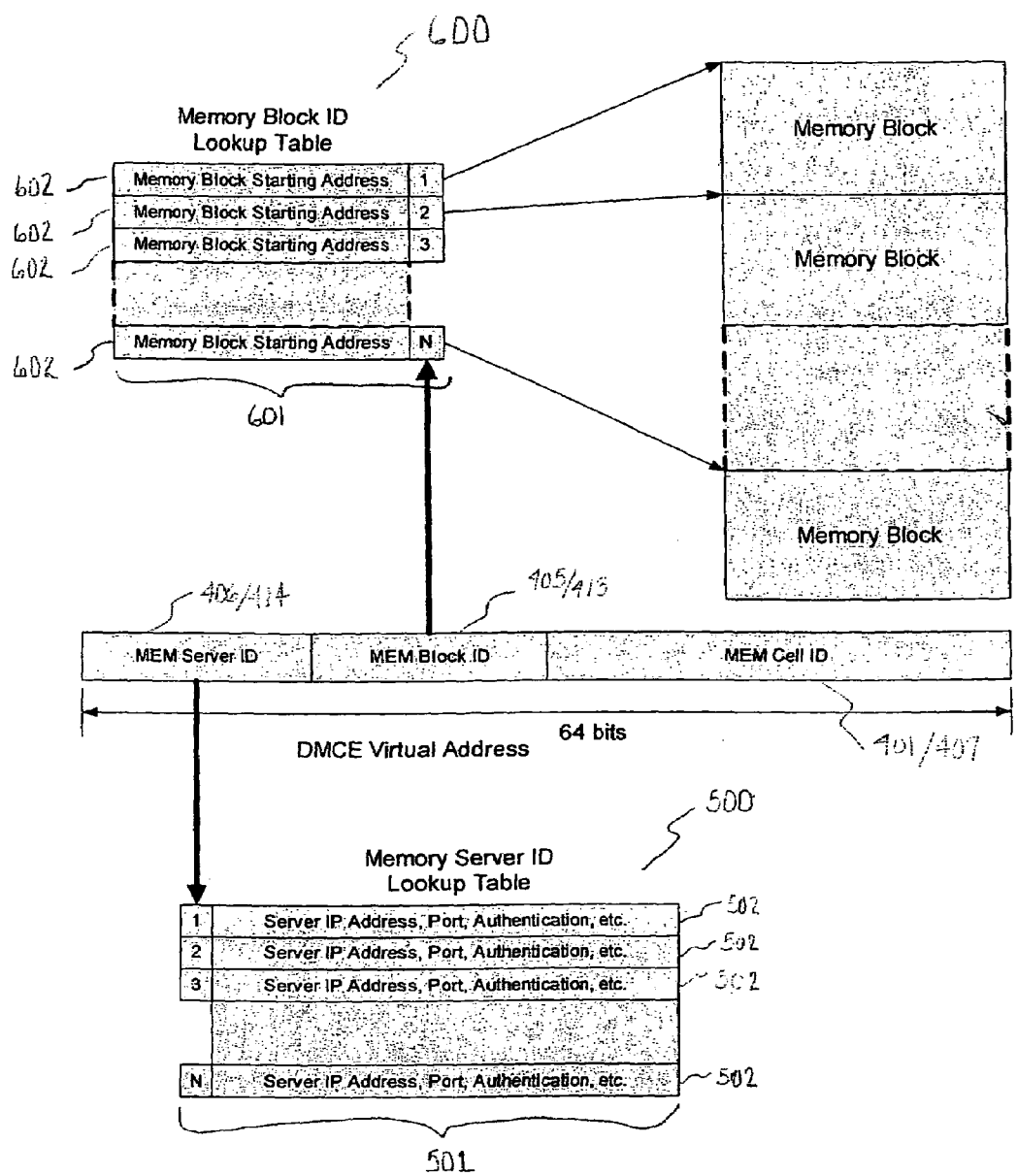
FIG. 10 illustrates a conceptual block diagram of how to use a "MEM Block ID" and a "MEM Server ID" in an embodiment of the Virtual Address scheme of the present invention.

Referring to FIG. 10, the MEM Server ID 401, 407 is an index to a Memory Server ID Lookup Table 500.

Each entry 501 in the Memory Server ID Lookup Table 500 is a mapping between MEM Server ID (index) 406/414 to an entry of server information 502 including a Server IP address, a port number, authentication, etc. The server information 502 includes whatever information is needed to connect a Memory Client 1006 and a Memory Server 1002 (illustrated in FIGS. 1A and 1B).

Still referring to FIG. 10, the MEM Block ID 405,413 is an index to the Memory Block ID Lookup Table 600. By using this method, one can swap two blocks of memory without having to re-map all individual addresses, instead only changing the mapping entry in the Memory Block ID Lookup Table (assuming memory content are the same).

Figure 2:
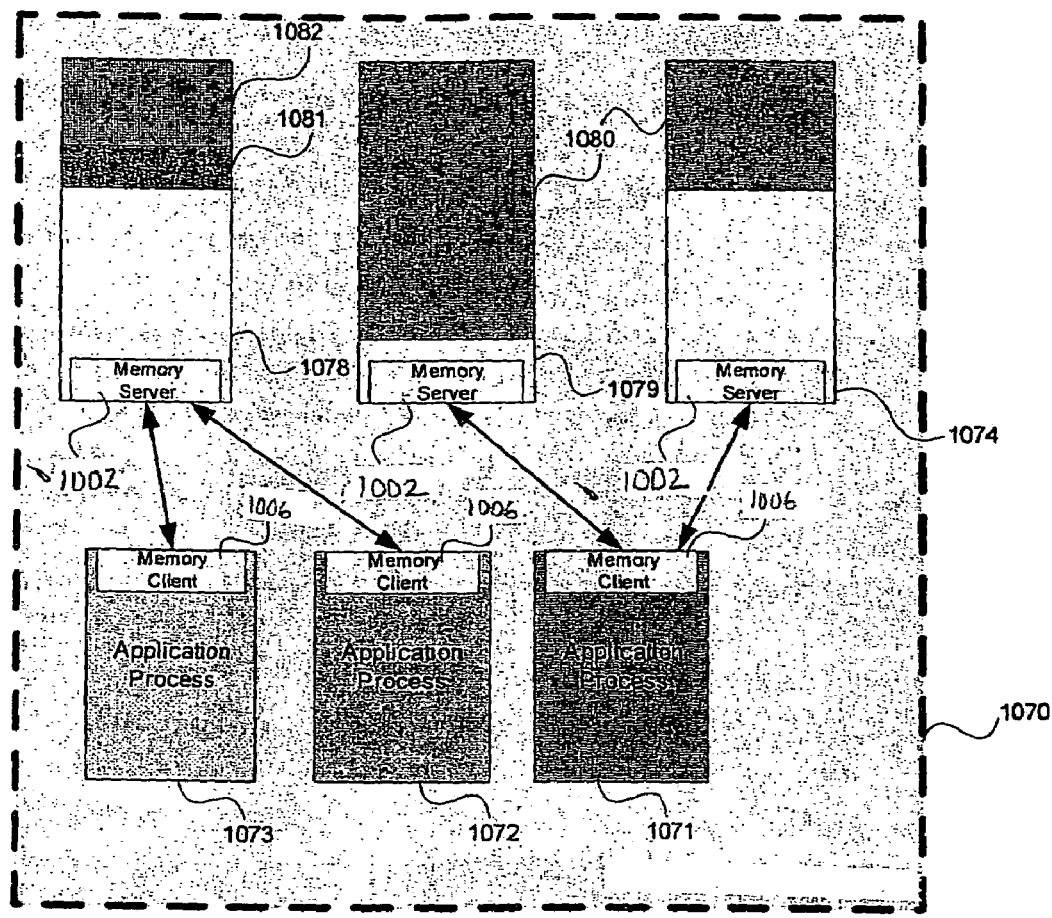
FIG. 2 illustrates a conceptual block diagram of a first embodiment of a method of an In-Server memory-sharing scheme of the present invention.
Figure 3:
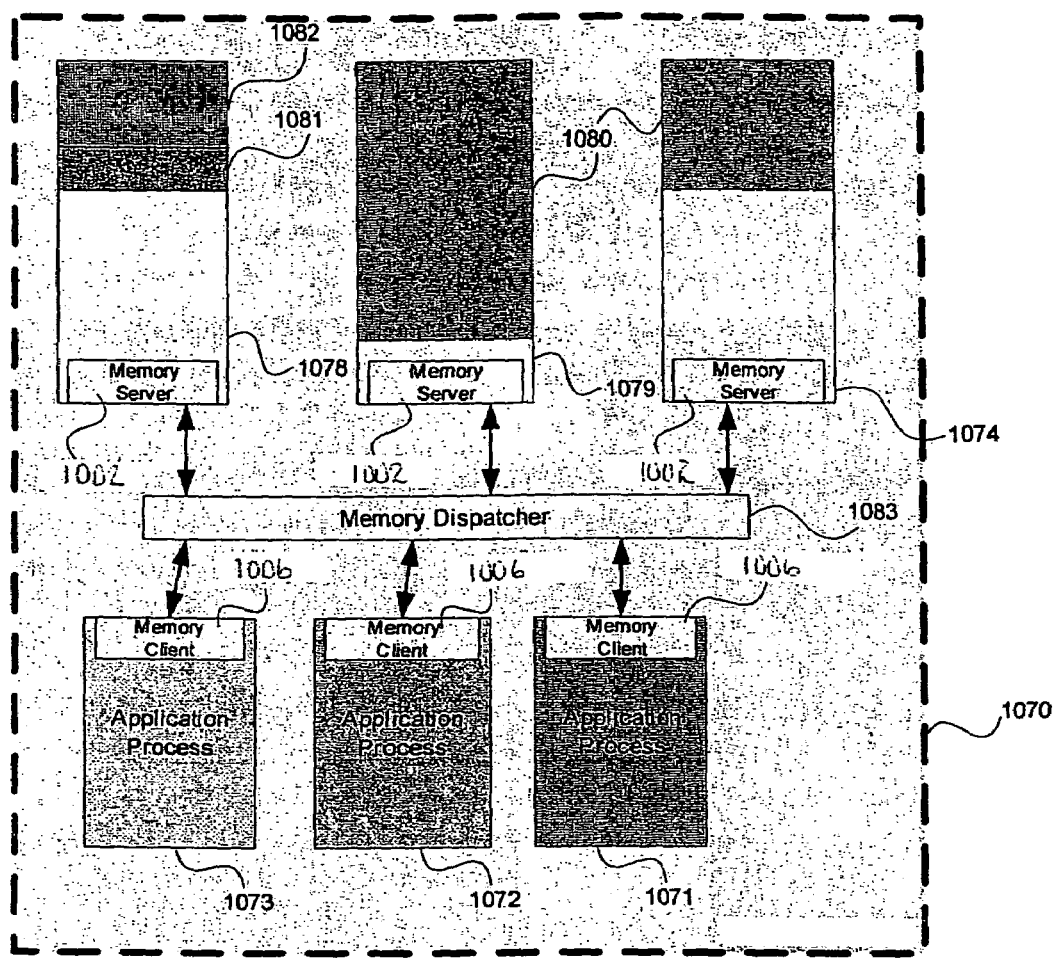
FIG. 3 illustrates a conceptual block diagram of a second embodiment of a method of an In-Server memory-sharing scheme of the present invention.

Still referring to FIG. 10, each entry 601 in the Memory Block ID Lookup Table is a mapping between a MEM Block ID (index) 405, 413 and an entry of memory block or page information 602 including a starting memory address, a memory page size, the number of memory pages in the block and the daemon process ID if a different block resides in a different daemon (further described herein referring to FIG. 2 and FIG. 3). The addressing scheme of FIGS. 8, 9, and I/O allows memory data to be moved between servers without having to re-map all individual addresses. Instead, only the mapping entry 406, 414 in the Memory Server ID Lookup Table (assuming memory content are the same) is changed.

Figure 11:
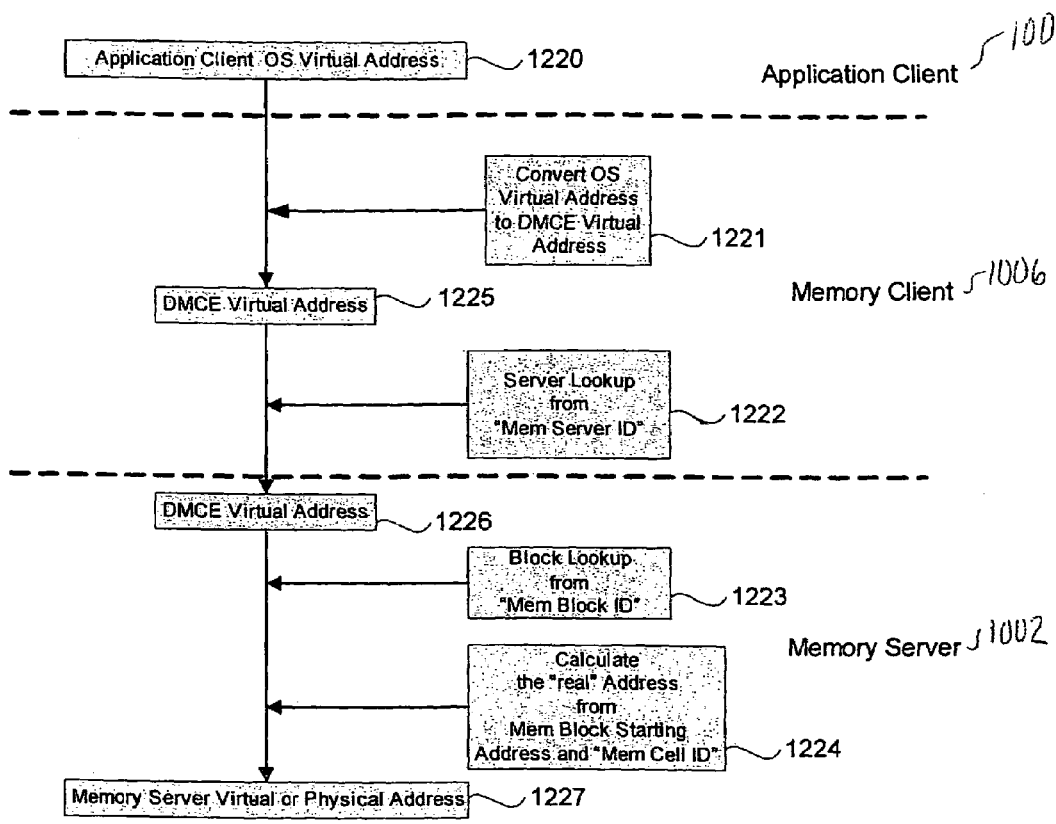
FIG. 11 illustrates a conceptual dataflow diagram of an embodiment of how to translate from an Operating System (OS) Virtual Address in an application program to the virtual or physical address on a Memory Server in accordance with an embodiment of the present invention.

Referring to FIG. 11, there is illustrated block diagram of how to access the "real" address 1227 on a Memory Server 1102 when given an Operating System virtual address from an application program. In step 1120, the Application Client 100 provides an Operating System virtual address to the Memory Client 1006. The Memory Client 1006 holds a translation table between OS Virtual Address and DMCE Virtual Address. Using the Memory Client translational table, the Memory Client 1006 then translates the OS Virtual Address to a DMCE Virtual Address 1221. The DMCE Virtual Address is 1225. Then Memory Client 1006 uses the MEM Server ID 406/414 to get related Server information 502 (as illustrated in FIG. 10) and connect to the identified server for further processing. 1222. The Memory Server 1002 gets request from Memory Client 1006 for memory access 1226. The Memory Server 1002 accesses the Memory Block ID Lookup Table (600, as illustrated in FIG. 10) to determine the MEM Block ID and MEM Cell ID 1223. Next, the Memory Server 1002 calculates the "real" address from the starting address of the memory block (602, as illustrated in FIG. 10) and the MEM Cell ID 1224. The result is either the Memory Server Virtual Address or the actual Physical address 1227.

Referring to FIG. 8, there is illustrated block diagram of how the real address 403 is calculated in a 32-bit Operating System environment. First, the MEM Block ID 405 is used to get the Memory Block Starting Address 602 of the targeted memory block from Memory Block ID Lookup Table 600 as illustrated in FIG. 10. The memory offset stored in MEM Cell ID 401 is then added with the Memory Block Starting Address 402 to get the real address 403. Referring to FIGS. 9 and 10, there is illustrated block diagram of how the real address is calculated in a 64-bit Operating System environment. The 64-bit OS address includes portions of 40-bits 409, 410 and 24-bits 411, 412, as illustrated. The OS address illustrated is a Linux 64 Intel version. It will be appreciated by one skilled in the art that other 64-bit OS address structures are similar, and do not depart from the scope of the present invention. The calculation using the lowest 40-bits is similar to that with the 32-bit OS. The MEM Cell ID 407 in the lowest 40-bits is used to get the Memory Block Starting Address 602, retrieved from the Memory Block ID Lookup Table 600 using MEM Block ID 413. The high 24-bits of the Memory Block Starting Address 411 are directly copied to the high 24-bits of the Real Address 412, as illustrated in FIG. 9.

FIG. 2 and FIG. 3 illustrate extending memory access over the 4 GB limitation of 32-bit operating system. It will be appreciated by one skilled in the art that such extension systems and methods are applicable to a 64-bit OS without departing from the scope of the present invention. The FIG. 2 illustrates a configuration that client application process directly uses DMCE Virtual address to access memory in Memory Server. FIG. 3 is a more optimized configuration of FIG. 2 in which client application indirectly accesses memory in a Memory Server through a Memory Dispatcher. In the embodiment illustrated in FIG. 3, the extended memory is virtually transparent to the client application process, meaning that the client application process cannot distinguish between the memory from its local usual address and the memory extended from Memory Server. Both two configurations are applicable to the cross-server networked DMCE environment. For use of the embodiment of FIG. 3 (i.e., virtually transparent memory mapping) in a 32-bit in-server or cross-server environment, the total addressable memory for an application process should be within 4 GB, but this is not required for a 64-bit environment. The "Virtually transparent memory mapping" as illustrated in FIG. 3 is most desirable for 64-bit environment. For any application process in 32-bit environment that desires to access more than 4 GB of memory, FIG. 2 is the preferred embodiment for both in-server and cross-server situations. Both FIG. 2 and FIG. 3 are applicable if the total required addressable memory is less than 4 GB in a 32-bit environment.

Referring to FIG. 2, there is illustrated block diagram in which a daemon 1074, 1078, 1079 in a server each holds one or more Blocks of memory. Application processes 1071, 1072 and 1073 access extended memory through the DMCE. Each daemon process 1074, 1078, 1079 can access about 3 GB memory. By borrowing memory from other daemons, e.g., daemon 1074 can borrow from daemon 1078, daemon 1079, or both, one application can access more than 4 GB memory in a 32-bit environment. As illustrated in FIG. 2, one memory daemon can serve more than one memory client. For example, memory server 1078 serves application processes. And as illustrated in FIG. 2, one application process can borrow memory from more than one memory servers. For example, application process 1071 borrows memory from daemons 1079 and 1074. In order to make in-server DMCE and cross-server (i.e., networked) DMCE transparently equivalent in the DMCE Virtual Address, the MEM Server ID "0" is reserved for referring to the local server 1070.

Referring to FIG. 2, an across-server DMCE Environment is illustrated when Memory Servers 1078, 1074 and 1079 are on different physical servers.

Referring to FIG. 3, extending memory access over the 4 GB limitation of 32-bit operating system within a server with memory communication through a Memory Dispatcher 1083 is illustrated. Memory Dispatcher 1083 keeps a memory usage history and, therefore, has the capability to balance dispatch memory usage across different Memory Servers 1076. The Memory Dispatcher 1083 may optionally be configured to provide fault tolerance by keeping two copies of the same memory blocks in two (or more) different Memory Servers 1076. When one Memory Server 1076 fails, the Memory Dispatcher 1083 will automatically redirect the memory access to the healthy Memory Server 1076.

Still referring to FIG. 3, such a Memory Dispatcher 1083 in a cross-server DMCE can be built into a special device for faster processing. That special device is further described as Memory Area Network ("MAN") Switch 1066, illustrated in FIG. 5. The MAN Switch will be further illustrated below referring to FIGS. 5 and 20.

Still referring to FIG. 3, such a Memory Dispatcher 1083 in an in-server DMCE provides transparent address mapping between an OS Virtual Address and a DMCE Virtual Address. The Memory Dispatcher 1083 holds a Lookup Table between the OS Virtual Address and the DMCE Virtual Address. If such functionality is embedded into the Operating System kernel, then existing application programs running on that OS will not have to be recompiled. When memory servers further group into a network and one of its main functionalities is to provide memory sharing service to clients, such a network is called Memory Area Network (abbreviated as "MAN"), as illustrated in FIGS. 4 and 5.

Figure 4:
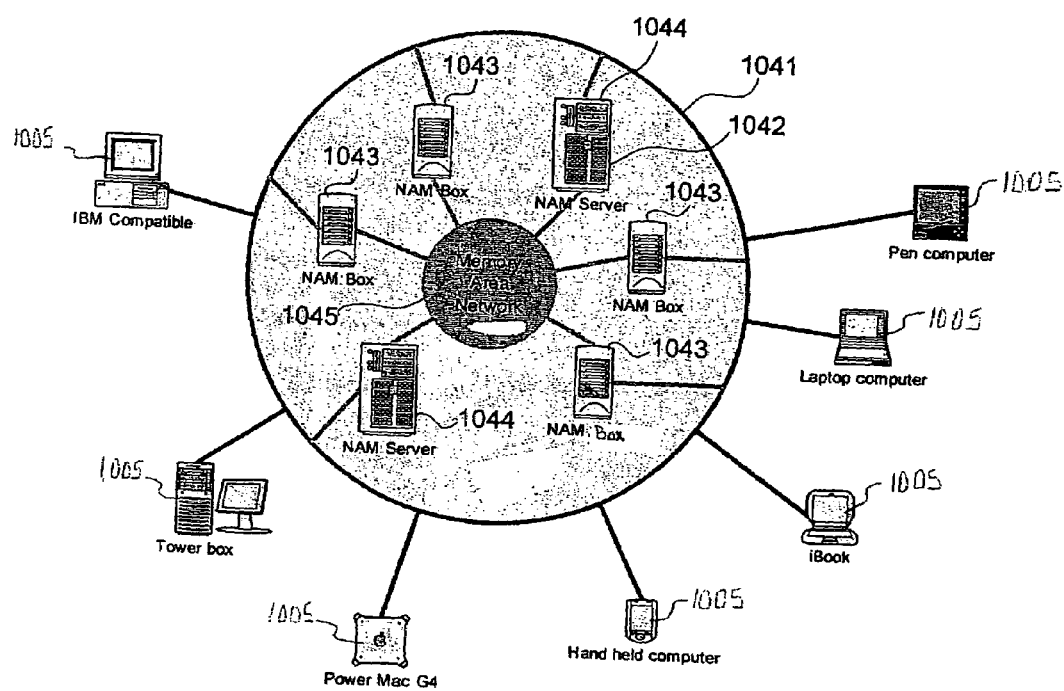
FIG. 4 illustrates a conceptual block diagram of an embodiment of a method of a Memory Area Network configuration scheme of the present invention.
Figure 5:
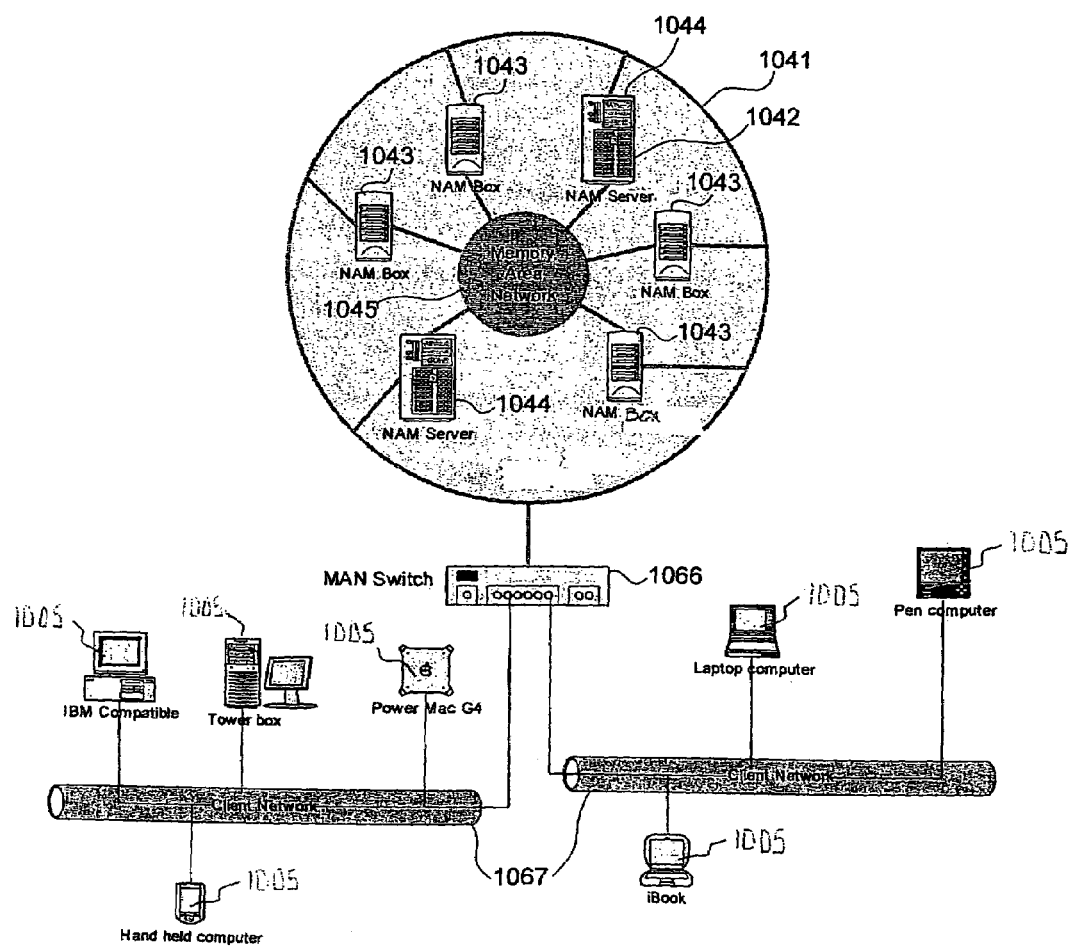
FIG. 5 illustrates a conceptual block diagram of a second embodiment of a method of a Memory Area Network (MAN) configuration scheme of the present invention.
Figure 6:
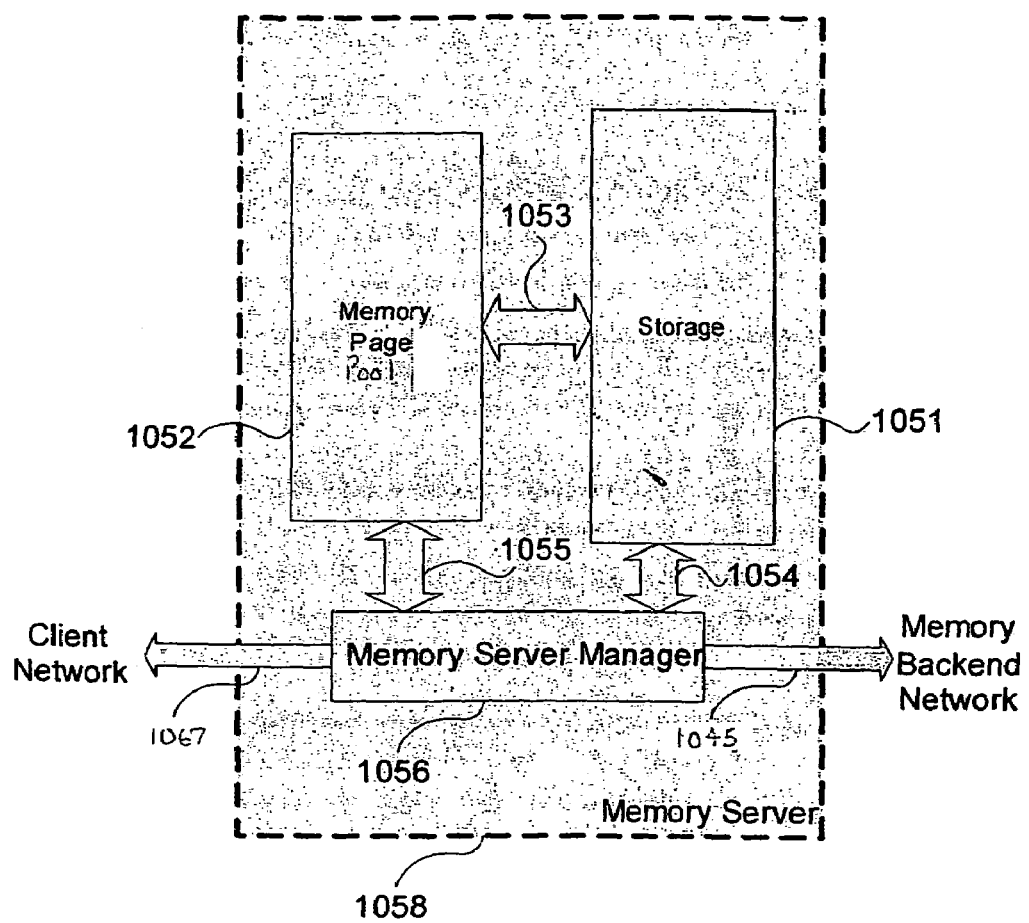
FIG. 6 illustrates a conceptual block diagram of an embodiment of a Network Attached Memory device or server of the present invention.

Referring to FIGS. 4 and 5, a networked server, which has Memory Server functionality and will be further disclosed in connection with FIG. 6), is referred to as a Network Attached Memory Server 1044 (abbreviated as "NAM Server"). A networked appliance or device that has Memory Server functionality is called a Network Attached Memory Box 1043 (abbreviated as "NAM Box"). There are no strict differences between a NAM Server and NAM Box, they often refer to the same thing, and they are often each referred to simply as NAM. A NAM Server 1044 may provide more functionality than a NAM Box 1043, but not required. Additionally, Network Attached Storage (NAS) functionality and NAM functionality may be combined into one server. It will be appreciated by one skilled in the art that hardware and software for providing networked sources for sharing memory may be achieved in a variety of ways.

A memory client 1005 is a client application 1006 or a client machine 1005 that has Memory Client functionality built-in or installed. The Memory Client 1005 will be further disclosed referring to FIG. 7 below.

Referring to FIGS. 4 and 5, a Memory Area Network 1041 (abbreviated as "MAN") is a network with a group of NAM Servers 1044 and/or NAM Boxes 1043. The Memory Area Network 1041 provides not only memory sharing service to memory clients 1005, but also provides memory access load balance, fault tolerance, high scalability, and high availability. Still referring to FIGS. 4 and 5, NAM Servers 1044 and NAM Boxes 1043 are connected with two networks 1045, 1067. Network 1067 is used to serve the memory clients for a memory sharing service and is called a Client Network 1067. The Network 1045 is used for MAN functionality (backup, mirroring, fault tolerance, etc.) and is called a MAN Network or Memory Backend Network 1045.

Still referring to FIG. 4, the MAN Network 1041 can be configured such that one NAM Server 1044 or Box 1043 is backed-up by another or several other NAM Servers 1044 or Boxes 1043. In the operation, any changes on a source NAM 1044, 1043 will be copied through MAN Network 1041 to other backup NAM(s) 1044, 1043. It will be appreciated by one skilled in the art that a variety of backup and recovery schemes may be implemented with the present invention. An embodiment of a backup and recovery scheme is further disclosed referring to FIG. 19 below. Additionally, when a source NAM fails 1044, 1043, one can replace a failed NAM 1044, 1043, with a new NAM 1044, 1043, by recovering the memory content of the failed NAM 1044, 1043 from the backup NAM(s) 1044, 1043, and storing the contact in the new NAM 1044, 1043.

Still referring to FIG. 4, in order for automatic fault tolerance and scalability to work and to achieve load balance, one NAM will serve as a Memory Dispatcher (called NAM Dispatcher). The NAM Dispatcher itself can serve memory sharing service, but additionally it will keep a memory usage history and redirect incoming memory (initial) setup requests based on a load balance algorithm. That load balance algorithm, such as round-robin, or others known in the art, will pick up the next server (which will further be disclosed referring to FIG. 13) and redirect memory access requests ("malloc" "read", "write", "delete" which will be further disclosed in FIGS. 14, 15, 16 and 17) to that next server. In such an automatic scheme, all memory requests will first be examined by the NAM Dispatcher. Therefore, NAM Dispatcher will keep a lookup table of each connection session to its targeted NAM (picked by NAM Dispatcher at "setup" and/or "malloc" stages).

The embodiment illustrated in FIG. 5 is similar to the embodiment of FIG. 4, except that the NAM Dispatcher is replaced with a dedicated MAN Switch device 1066, which will do the work of the NAM Dispatcher in FIG. 4.

Figure 20:
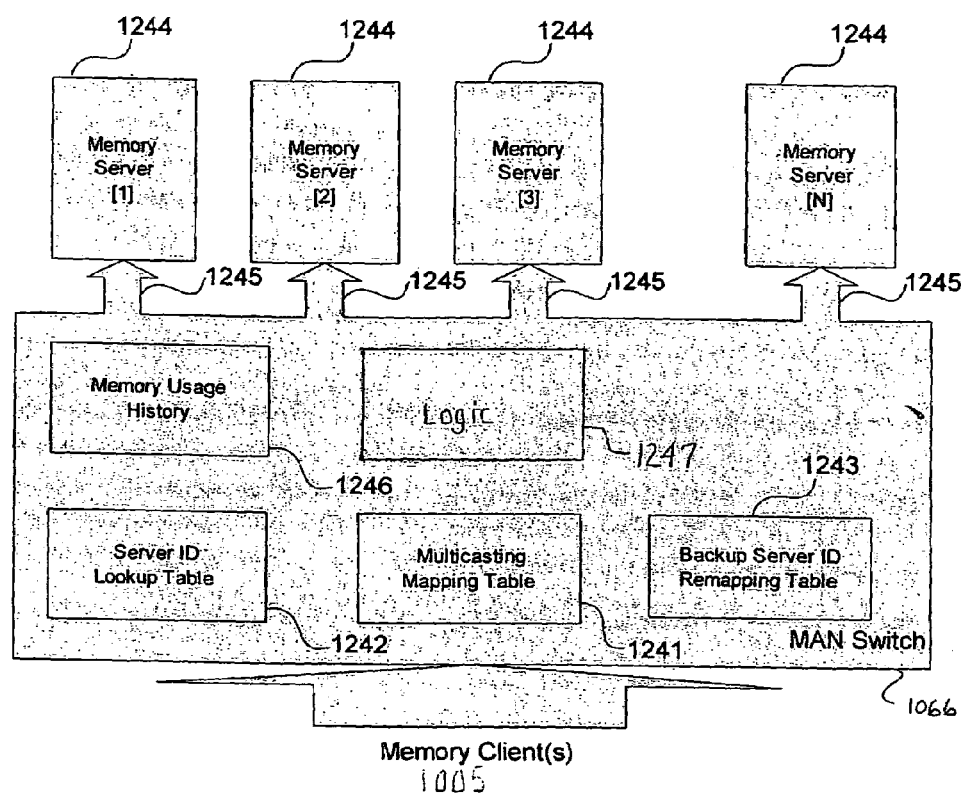
FIG. 20 illustrates a conceptual block diagram of Memory Area Network Switch which improves the speed of memory sharing based on a Virtual Address in an embodiment of the present invention.

Referring to FIG. 20, there is further illustrated a block diagram of a MAN Switch device 1066., also shown as the NAM Dispatcher in FIG. 4 or MAN Switch 1066 in FIG. 5. The MAN Switch 1066 keeps at least the following information: Memory Usage History 1246, Memory Server ID Lookup Table 1242, Multicasting Mapping Table 1241 and Backup Server ID Recapping Table 1243.

Still referring to FIG. 20, the Memory Usage History 1246 in the MAN Switch 1066 includes the information of how much memory is used for each NAM and the information of last memory operations. Such history information is used to determine which NAM will serve a next new "setup" or "malloc" to archive a memory usage load balancing if so desired. MAN Switch 1066 has one or more built-in load balance algorithms, such as round-robin, or other load balance algorithms known in the art. When several load balance algorithms are available, it is configurable to use one of them for load balancing.

Still referring to FIG. 20, the Server ID Lookup Table 1242 at least includes the information of Server ID (index) to Server IP address, port, and (optional) authentication. Such information is used in directing memory access requests to targeted NAM(s) 1244.

Still referring to FIG. 20, the Backup Server ID Recapping Table 1243 in MAN Switch 1066 includes the information of which NAM(s) 1244 are the backup of one NAM 1244, and is mapped from one MEM Server ID and MEM Block ID to another MEM Server ID and MEM Block ID. Such information is used when backup and/or recovery is enabled between the source NAM 1244 and target NAM(s) 1244. When source NAM fails 1244, MAN Switch 1066 uses the addressing information to automatically re-map the memory request originally addressing to source NAM 1244 to a backup NAM(s) 1244.

Still referring to FIG. 20, the Multicasting Mapping Table 1241 in MAN Switch 1066 is similar to the Backup Server ID Recapping Table 1242. The Multicasting Mapping Table 1241 is used when MAN Switch 1066 is configured to automatically mirror updates, e.g., "write" and "delete", of the source NAM 1244 and their backup NAM(s) 1244. Any memory update requests, e.g., "write" and "delete", are then multicast to source NAM 1244 and backup NAM(s) 1244 at the same time. Multicasting eliminates multiple update requests in Memory Backend Network 1045 of FIG. 5.

Still referring to FIG. 20, the MAN Switch 1066 includes logic 1247 to pick the next NAM to when incoming memory allocation "malloc" have used the available memory of a NAM. Such functionality is required for automatic scalability.

Referring to FIG. 6, a block diagram of Memory Server 1058 functionality is illustrated. For networked DMCE, a networked Memory Server 1058 includes one network connection to Client Network 1067 and another network connection to Memory Backend Network 1045 (or called MAN Network). The two network connections to the Client Network 1067 and the Memory Backend Network 1045 may be collapsed into one. For in-server DMCE, such connection can be replaced by an inter-process connection based Memory Messaging Channel. An exemplary embodiment of a Memory Messaging Channel is described in related application Memory-Resident Database Management System and implementation thereof, filed Jan. 22, 2003, Inventors Jonathan Vu and Tianlong Chen, incorporated herein by reference. The main functionality of these connections, either networked or in-server, is to provide a communication channel, or messaging channel, between a Memory Client 1005 and a Memory Server 1002. The communication or messaging channel allows a Memory Client 1005 to send memory requests to a Memory Server 1002 and allows a Memory Server 1002 to send memory responses back to the Memory Client 1005 after processing. The network connection can provide a variety of data transfer rates, e.g., Fast Ethernet, Gigabit Ethernet, Fiber Channel, USB, and the like.

Still referring to FIG. 6, the Memory Server 1058 has a Memory Page Pool 1052, which may contain one or more Memory Blocks, with every Memory Block containing large volumes of Memory Pages. In a 32-bit environment, each Memory Block will not exceed 4 GB in size. The size of each Memory Block is configurable, the size of Memory Pages in a Memory Block can be configurable, and two different Memory Blocks do not have to have the same sized Memory Pages.

Still referring to FIG. 6, the networked Memory Server 1058 may optionally contain a file based Storage 1051. File based storage 1051 may be, for example, one or more of hard disks, NAS's, SAN's, etc., and/or combinations thereof. File based storage 1051 is used to provide memory-to-file backup and recovery functionality 1053, (which is further described referring to FIG. 19. Memory (RAM) I/O is normally much faster than hard disk I/O. However most current physical memory cannot hold its content if the power fails. The kind of Memory, which has fast I/O and can hold its content after power loss, is still very expensive. Thus, file-based storage is used only in some backup and recovery architectures of the present invention.

Still referring to FIG. 6, at the center of networked Memory Server 1058 is a function block called Memory Server Manager 1056. The Memory Server Manager 1056 keeps a Memory Block Lookup Table (as illustrated in FIG. 9 and FIG. 10) for virtual address mapping calculation. The Memory Server Manager 1056 handles parsing and processing the incoming memory requests, and packing outgoing memory responses. Optionally, Memory Server Manager 1056 provides backup memory pages from memory to file storage, recovery of memory pages from file storage to memory, memory backup and recovery from one server to another, and (optionally) memory block backup and recovery from one Memory Block to another. Items 1053 and 1054 refer to logical connections. The Memory Server Manager 1056 also handles communication between Memory Server 1058 and Memory Client 1005 (not shown in FIG. 6) through either a networked or in-server connection channel (also called Memory Messaging Channel). Memory Server Manager 1056 optionally handles communication between Memory Server 1058 and other Memory Servers (not shown) for inter-server functionality as disclosed in Memory Area Network (MAN) 1041 (referring to FIG. 4 and FIG. 5) system configuration. Memory Server 1002 may further provide functionality as described in related application Memory-Resident Database Management System and implementation thereof, incorporated by reference herein.

Figure 7:
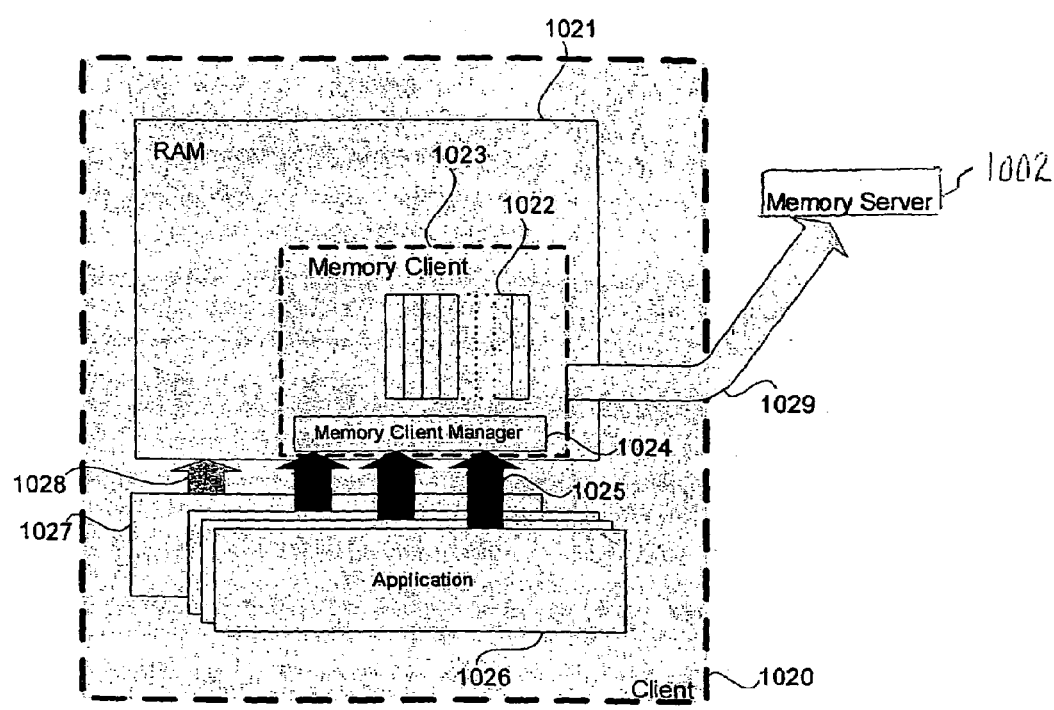
FIG. 7 illustrates a conceptual block diagram of a Memory Client on a client machine in accordance with an embodiment of the present invention.

Referring to FIG. 7, a block diagram of Memory Client 1023 functionality is illustrated. Memory Client 1023 is a functional block that resides in the RAM 1021 of a client machine 1020 as an agent to handle all the detailed functionality of memory extension 1029 to a Memory Server 1002. Memory Server functionality can be structured in two scenarios. One scenario is that application links directly to the Memory Client 1020 and uses the DMCE Virtual Address directly to access extended memory. However, this scenario requires re-compiling the application, but is the preferred scenario for those applications that need to access more than 4 GB memory in a 32-bit environment. The other scenario is that Memory Client 1020 is embedded in memory management unit of the underlying OS kernel to transparently provide extended memory to other applications, and this is ideally desirable for a 64-bit or greater environment.

Figure 21:
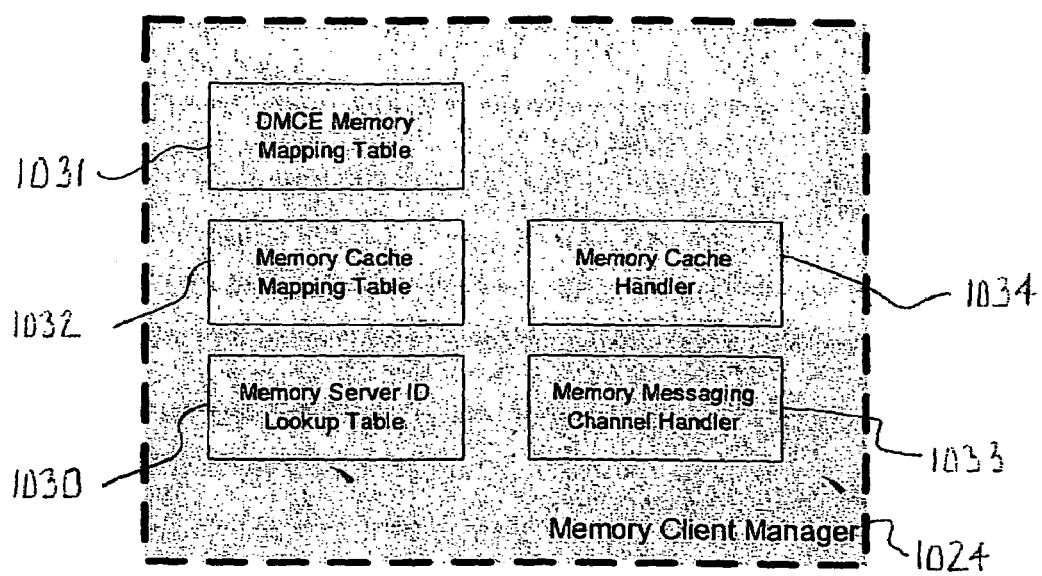
FIG. 21 is a block diagram of memory mapping in a Memory Cache Mapping Table in accordance with a preferred embodiment of the present invention.

Still referring to FIG. 7, the Memory Client 1023 has a block of memory as Memory Cache 1022 and Memory Client Manager 1024. The relation of the Memory Client Manager 1024 and Memory Cache 1022 is like the relation of the CPU and CPU cache in a personal computer. That is, the memory pages currently accessed by Memory Client Manager 1024 and its actual final user, i.e., the applications 1026 are cached in the Memory Cache 1022. When the application 1026 tries to access memory page(s) that is not currently loaded in Memory Cache 1022, the Memory Client Manager 1024 will send an access request to Memory Server 1002 requesting the targeted memory page(s), put the memory content into the Memory Cache 1022, and register the memory mapping in a Memory Cache Mapping Table (as illustrated in FIG. 21). Then, the application 1026 can access the targeted memory pages. When application 1026 tries to access a memory page, Memory Client Manager 1024 will first look at the Memory Cache 1022 to check whether the targeted memory page is there. If the targeted memory page is in the Memory Cache 1022, then application 1026 accesses the memory page in Memory Cache 1022. The size of the Memory Cache 1022 is configurable.

Still referring to FIG. 7, in order to synchronize the memory pages in the Memory Cache 1022 and the corresponding memory pages in the Memory Server 1002. Technology similar to CPU Caching can be used in the present invention, such as write-through, meaning that the information is written to the memory page in Memory Cache and immediately updated ("write") to the corresponding memory page in Memory Server 1002, or write-back, meaning that the information is only written to the memory page in Memory Cache 1022, and the modified page is written to Memory Server 1002 only when it is replaced. It will be appreciated by one skilled in the art that the updating behavior of the Memory Client 1023 is configurable.

Still referring to FIG. 7 and FIG. 21, the Memory Client Manager 1024 is the central logic function block of the Memory Client 1023. Memory Client Manager 1024 keeps a Memory Server ID Lookup Table 1030 in order for the Memory Client 1023 to borrow memory. Memory Client Manager 1024 also keeps a DMCE Memory Mapping Table 1031 to track currently used memory page mapping between OS virtual addresses and DMCE virtual addresses. This DMCE Memory Mapping Table 1031 is not used if the application program directly uses the DMCE Virtual Address. The Memory Client Manager 1024, using Memory Cache Handler 1034, keeps a Memory Cache Mapping Table 1032 in order to track what memory pages are currently in the Memory Cache 1022. The Memory Client Manager 1024 also handles the communication between Memory Client 1023 and Memory Server 1002 on behave of Memory Client, packs the outgoing memory service request and parses the incoming response from Memory Server 1002, and takes actions accordingly. An embodiment of a Memory Sharing Messaging Protocol used by the Memory Client 1023 is further described below, referring to FIGS. 13, 14, 15, 16, 17 and 18.

Referring to FIGS. 13, 14, 15, 16, 17 and 18, block diagrams of an embodiment of a Memory Sharing Messaging Protocol (called "MSMP"), including "setup", "malloc", "read", "write", "delete" and "disconnect", are illustrated. Dashed lines 1119, 1141, 1161, 1182, 1261, and 1213 separate functions between Memory Client 1006 and Memory Server 1002. All protocol actions are initiated by a Memory Client 1006. Memory Messaging Channel Handler 1033 controls exchanges of information between the Memory client Manager 1024 and the Memory Server Manager 1056.

Figure 13:
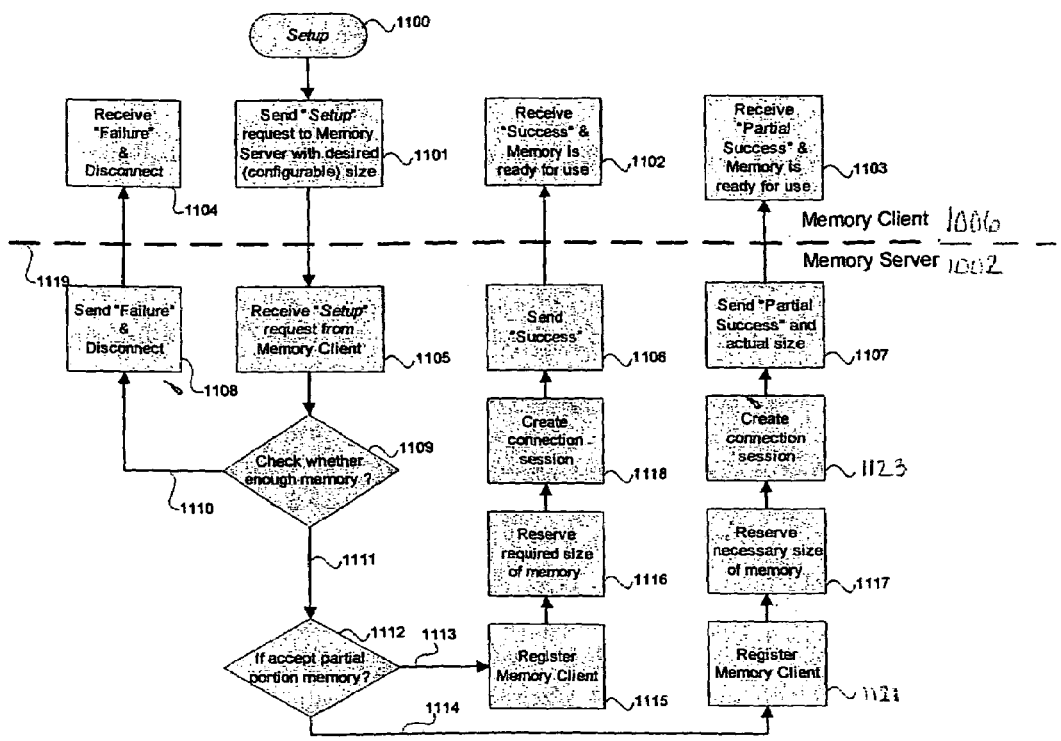
FIG. 13 illustrates a conceptual dataflow diagram of how to setup memory sharing from Memory Client to Memory Server in an embodiment of the present invention.

Referring to FIG. 13, there is illustrated block diagram of "setup" defining the basic protocol steps to allow a Memory Client 1006 and a Memory Server 1002 to establish a communication channel. The starting point is from 1100. The illustrated diagram of FIG. 13 assumes that the Memory Server 1002 is configured to reserve a requested block of memory at the setup time; however this static memory reservation is not necessary and can be disabled. Reservation at the setup time, preferably, provides easier management logic than a totally dynamic memory request, which may be a desirable feature when providing pay-by-usage memory sharing service. It will be appreciated by one skilled in the art that various combinations of static and dynamic reservations can be built into this protocol. As part of the "setup" stage, the Memory Server 1002 will register the Memory Client 1006 to a connection session table to track currently connected Memory Clients 1006.

Still referring to FIG. 13, setup of a communication channel begins at the Memory Client 1006 (step 1100). Memory Client 1006 sends the "setup" request to the Memory Server 1002 requiring a desired amount of memory 1101. The Memory Server 1002 determines if enough memory is available to satisfy the memory request 1109. If sufficient memory is not available 1110, the Memory Server 1002 sends a failure notice to the Memory Client 1006 and disconnects the session 1108. The Memory Client 1006 then receives the Failure and Disconnect status message 1104.

Still referring to FIG. 13, if enough memory is available to satisfy the memory request 1111, the Memory Server 1002 next determines whether the Memory Client 1006 will accept partial portions of memory 1112. If the Memory Client 1006 will accept partial portions of memory 1113, the Memory Client 1006 is registered 1115. Next, the Memory Server 1002 reserves the required amount of memory 1116. Once sufficient memory is reserved, the Memory Server 1002 creates a connection session 1118, and notifies the Memory Client 1006 that memory is available for use 1106, 1102.

Still referring to FIG. 13, if the Memory Client 1006 will not accept partial portions of memory 1114, the Memory Client 1006 is still registered 1115. Next, the Memory Server 1002 reserves the required amount of memory 1117. Once sufficient memory is reserved, the Memory Server 1002 creates a connection session 1118, and notifies the Memory Client 1006 that a partial amount of memory is available for use 1107, 1103.

Figure 14:
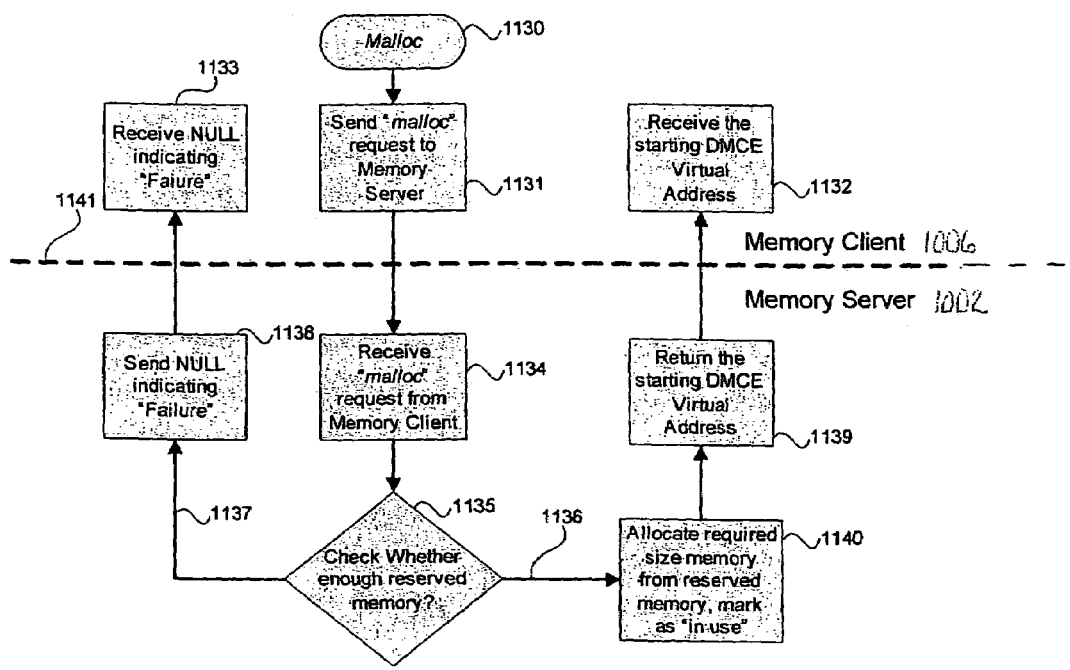
FIG. 14 illustrates a conceptual dataflow diagram of how to allocate (also called "malloc") memory from a Memory Client to a Memory Server in an embodiment of the present invention.

Referring to FIG. 14, there is illustrated block diagram of "malloc" defining the basic protocol steps allowing Memory Client 1006 to allocate memory pages from Memory Server 1002, either from statically reserved memory page pool or dynamically reserved memory pages. The starting point is from 1130. Memory Client 1006 sends a malloc request to Memory Server 1002 (step 1131). Memory Server 1002 receives the malloc request 1134, and determines if enough memory is available to satisfy the malloc request 1135. If sufficient memory is not available to complete the malloc request 1137, the Memory Server 1002 generates a failure notice 1138 and sends the failure notice to the Memory Client 1006 at step 1133. If sufficient memory is available to satisfy the memory request 1136, the Memory Server 1002 allocates the requested amount of memory and marks the memory "in use" 1140. The Memory Server 1002 then sends the starting DMCE Virtual address 1139 to the Memory Client 1006 at step 1132.

Figure 15:
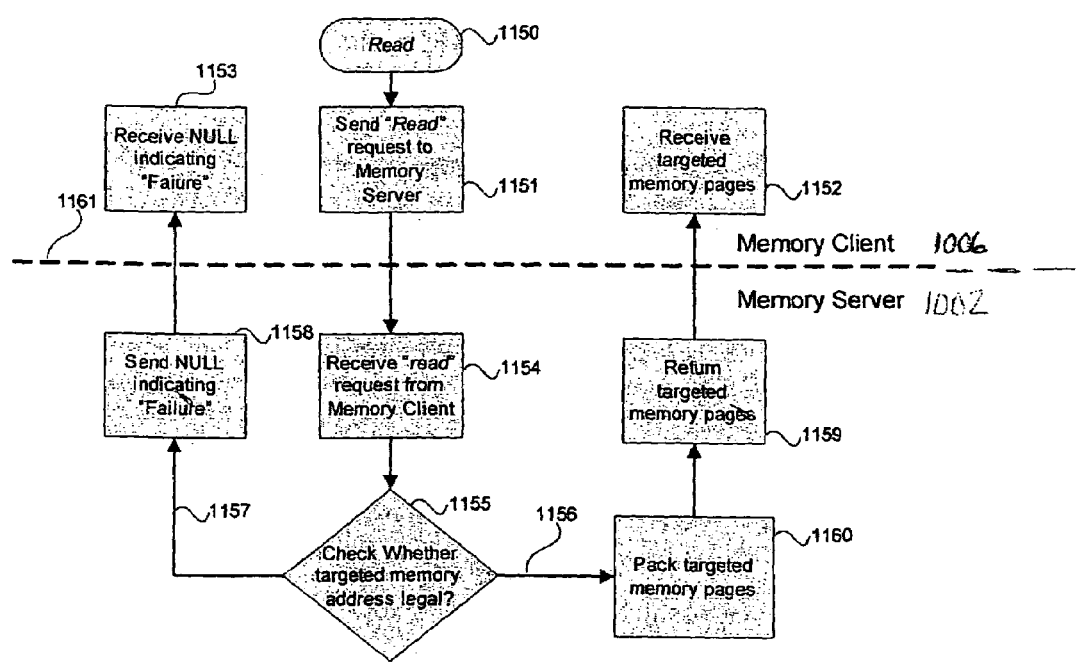
FIG. 15 illustrates a conceptual dataflow diagram of how to read content in memory from a Memory Client to a Memory Server in an embodiment of the present invention.

Referring to FIG. 15, there is illustrated block diagram of "read" defining the basic protocol steps when Memory Client 1006 wants to access memory pages for read, assuming that the requested memory pages are not in the Memory Cache 1022 (as illustrated in FIG. 7) otherwise such request to the Memory Server 1002 is not necessary. The starting point is from 1150. Memory Client 1006 sends a read request to the Memory Server 1002 at step 1151. The Memory Server 1002 receives the read request from the Memory Client 1006 at step 1154, and determines whether the targeted memory address to be read is legal 1155. If the address to be read is not legal, 1157, the Memory Server 1002 generates a failure message 1158, and notifies the Memory Client 1006 of the failure 1153. If the address is legal 1156, the requested memory pages are packed 1160 and returned to the Memory Client 1006 at steps 1159, 1152.

Figure 16:
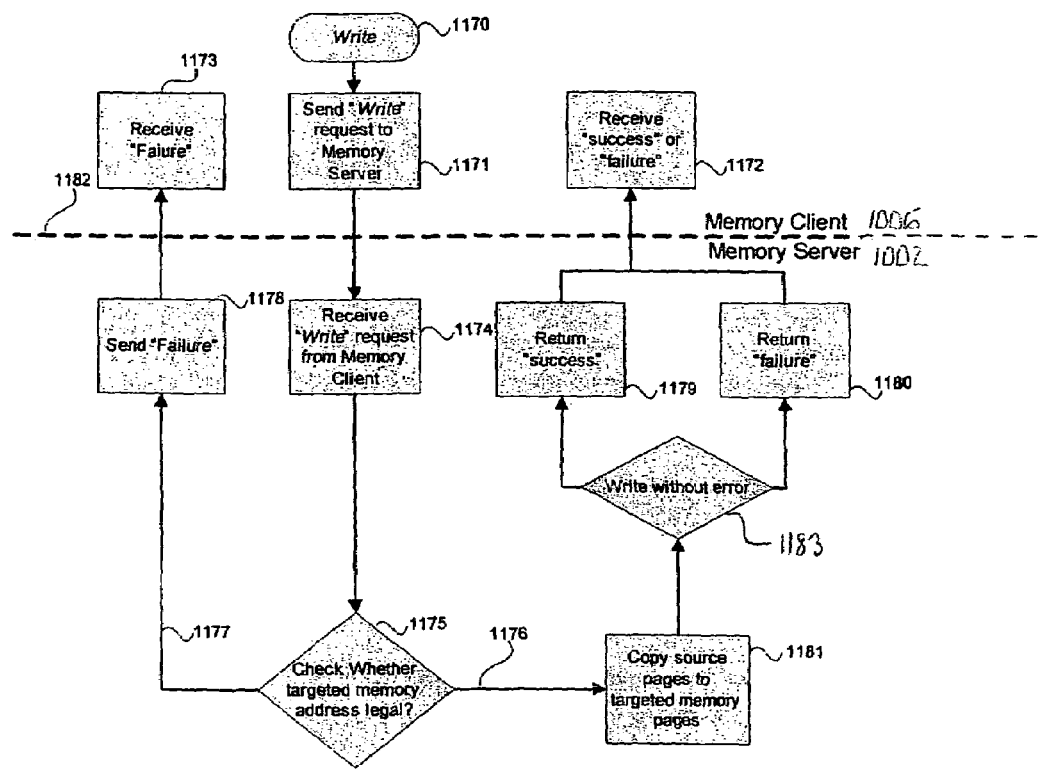
FIG. 16 illustrates a conceptual dataflow diagram of how to write content to memory from a Memory Client to a Memory Server in an embodiment of the present invention.

Referring to FIG. 16, there is illustrated block diagram of "write" defining the basic protocol steps when Memory Client 1006 has memory pages changed by applications and needs to update the corresponding memory pages in the Memory Server 1002. The starting point is from 1170. A Memory Client 1006 requests to write to memory through the Memory Server 1002 at step 1171. The Memory Server 1002 receives the Write request 1174 and determines whether the targeted memory address is legal 1175. If the targeted memory address is not legal 1177, the Memory Server 1002 sends a failure message to the Memory Client 1006 at steps 1178, 1173. If the targeted memory address is legal 1176, the Memory Server 1002 copies the source pages to be written to memory to targeted memory pages storing the content 1181. Next, the Memory Server 1002 checks the written data for error 1183. If the write request was performed without error, the Memory Server 1002 prepares and transmits a success message to the Memory Client 1006 at steps 1179, 1172. If an error occurs during the write to memory, the Memory Server 1002 prepares and transmits a failure message to the Memory Client 1006 at steps 1180, 1172.

Figure 17:
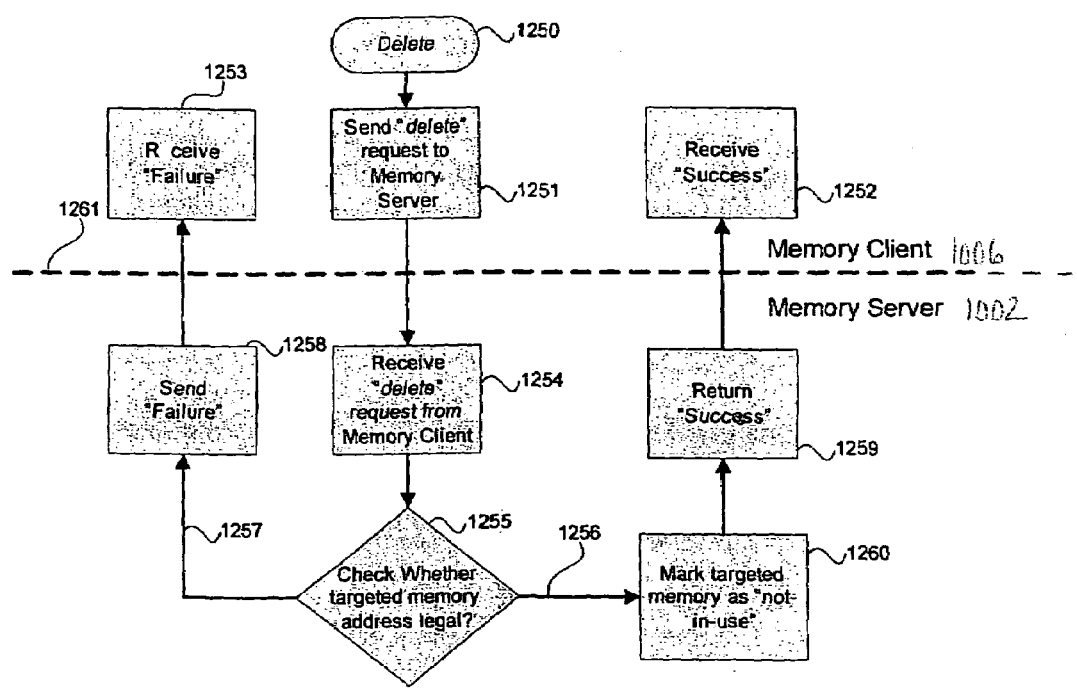
FIG. 17 illustrates a conceptual dataflow diagram of how to delete (or called "free") memory from a Memory Client to a Memory Server in an embodiment of the present invention.

Referring to FIG. 17, there is illustrated block diagram of "delete" (or called "free" sometimes) defining the basic protocol steps when Memory Client 1006 releases the memory pages and updates the memory status in Memory Server 1002. The starting point is from 1250. The Memory Client 1006 generates a request to delete data from memory and sends the request to the Memory Server 1002 at step 1251. The Memory Server 1002 receives the request from Memory Client 1006 at step 1254. Next, the Memory Server 1002 determines whether the targeted memory address is legal 1255. If the targeted memory address whose data is to be deleted is not legal 1257, Memory Server 1002 generates a failure message 1258 and notifies the Memory Client 1006 at step 1253. If the targeted memory address is legal 1256, Memory Server 1002 marks the targeted memory as "not-in-use" 1260. Next, Memory Server 1002 generates a success message 1259 and transmits the success message to the Memory Client 1006 at step 1252, indicating that the identified data has been deleted from memory storage.

Figure 18:
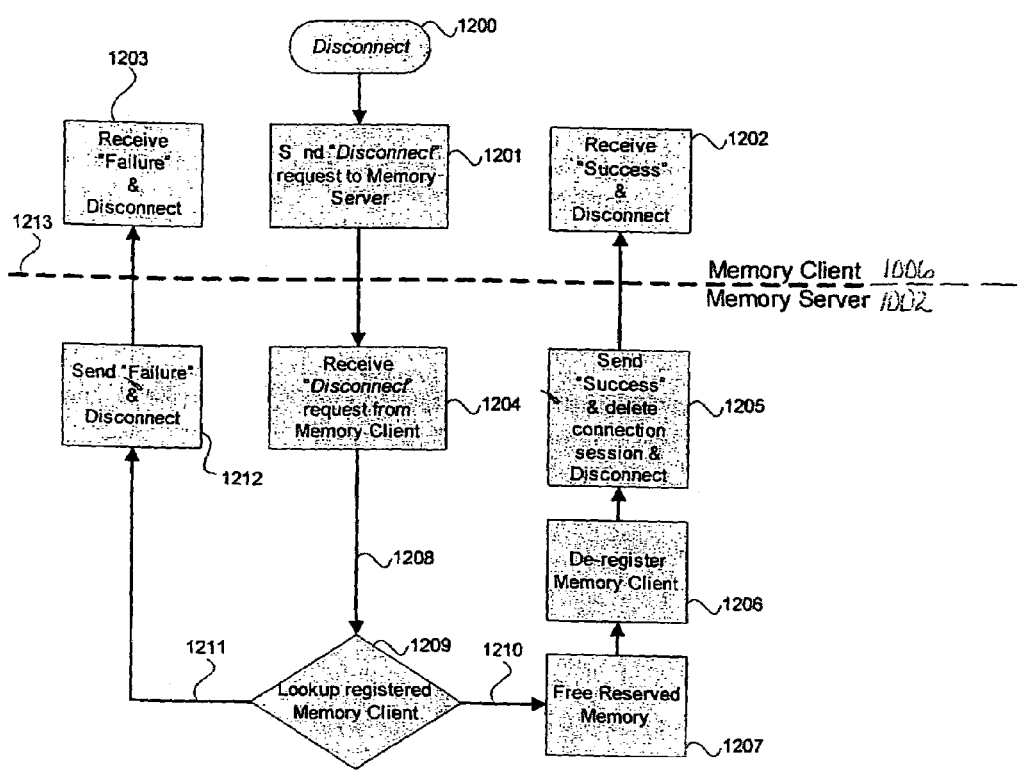
FIG. 18 illustrates a conceptual dataflow diagram of how to disconnect a Memory Client from a Memory Server in an embodiment of the present invention.

Referring to FIG. 18, there is illustrated block diagram of "disconnect" defining the basic protocol steps when Memory Client 1006 finishes the usage of the extended Memory Server 1002 and wishes to release the reserved (static or dynamic) memory pool in Memory Server 1006. The starting point is from 1200. Memory Client 1006 generates a request to disconnect from using extended memory 1201. Memory Server 1002 receives the request 1204, and checks tracking table to determine whether Memory Client 1006 is registered with Memory Server 1002, at step 1209. If the Memory Client 1006 is not registered 1211, Memory Server 1002 generates a failure message and notifies Memory Client 1006 at step 1203. If the Memory Client 1006 is registered 1210, Memory Server 1002 releases, i.e., frees, the reserved memory pool 1207. Next, Memory Server 1002 De-registers Memory Client 1006 by removing the Memory Client 1006 from its tracking table 1206. Memory Server 1002 then generates a notification that the Memory Client 1006 has successfully been disconnected, deleted the connection session, 1205 and notifies the Memory Client 1006 at step 1202.

Figure 12:
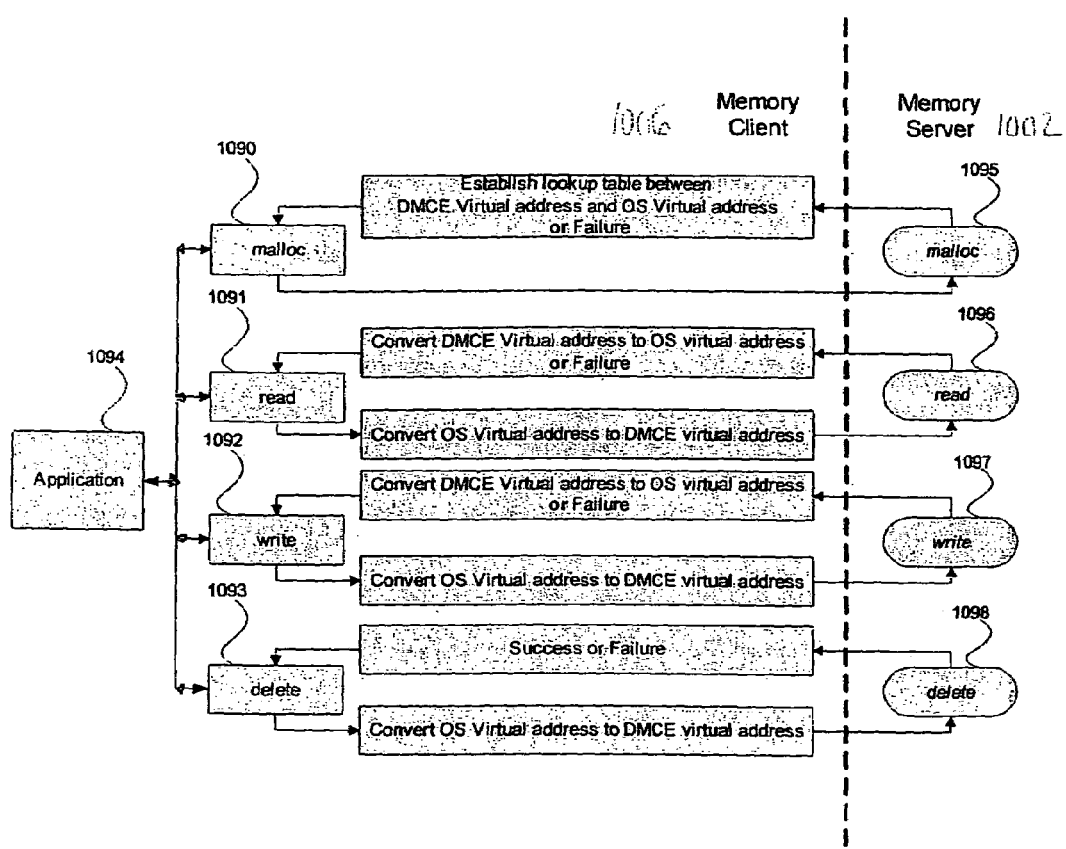
FIG. 12 illustrates a conceptual block diagram of how memory actions (including "malloc", "read", "write" and "delete") are working from an application to a Memory Server in accordance with the present invention.

Referring to FIG. 12, conceptual block diagram of how memory actions (including "malloc", "read", "write" and "delete") operate from an application 1026 to a Memory Server 1002 in accordance with the present invention.

Figure 19:
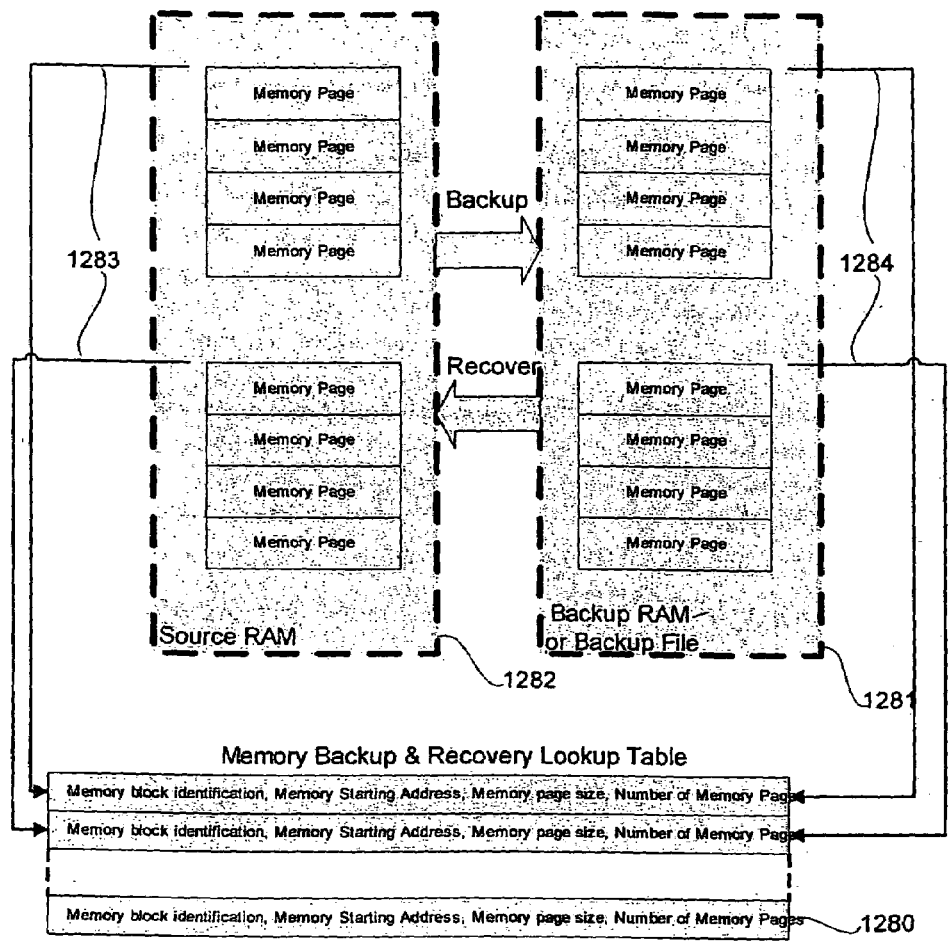
FIG. 19 illustrates a conceptual block diagram of a method of Memory to File or Memory to Memory Backup and Recovery in an embodiment of the present invention.

Referring to FIG. 19, there is illustrated block diagram of the optional memory to file storage and memory-to-memory backup and recovery functionality of the Memory Server. The Memory Server will keep a Memory Backup & Recovery Lookup Table 1280 in both RAM 1282 in the Memory Server and file storage 1281 in the Memory Server. The Memory Backup & Recovery Lookup Table 1280 includes the information of every Memory Block. Each Memory Block has one (or more) entries in the table. Each entry at least includes the Memory Block index, current starting address, and the corresponding backup file name for memory-to-file backup, the corresponding Memory Block index and its current starting address for memory-to-memory backup, memory page size and the number of memory pages in the Memory Block.

Referring to FIG. 19, as the DMCE Virtual Address schemes disclosed above, the content in memory pages are memory-address neutral, therefore, copying from Memory Blocks from source RAM 1282 to the Memory Blocks in Backup RAM/File 1281 or vice versa ensure data safe.

Other embodiments of the invention are to combine the present invention with any or all of those disclosed in U.S. patent application Ser. No. 10/347,678 entitled "Memory-Resident Database Management System and Implementation Thereof" filed on Jan. 22, 2003 by Tianlong Chen, Jonathan Vu, and Yingbin Wang, and U.S. Provisional Application 60/394,257 entitled "Central Linked List Data Structure Methods of Use" filed on Jul. 7, 2002 by Jonathan Vu, and U.S. Provisional Application 60/440,338 entitled "A Method And Or System To Perform Automated Facial Recognition And Comparison Using Multiple 2d Facial Images Parsed From A Captured 3d Facial Image" filed by Donald A. Milne, III and Jonathan Vu on Jan. 17, 2003, each of which is herein incorporated by reference.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A network attached memory device comprising:
   a CPU, and said network attached memory device having a device ID, and said device ID comprising an index to a device entry in a device ID lookup table;
   a memory having at least one memory block, and said memory block having a block ID;
   a connection to a network; and
   a memory management function managing said memory block in said memory,
   means for providing access to said memory block to a computing device attached elsewhere to said network such that a memory location in said memory block has a virtual address comprising said device ID, said block ID and an offset in said memory block.

2. A network attached memory device according to claim 1 wherein said computing device has a said device ID lookup table, and said device ID is an index to a device entry in the said device ID lookup table, and said device entry includes at least network connection information to the said network attached memory device.

3. A network attached memory device according to claim 1 wherein said memory management function includes a memory block ID lookup table, and said block ID of said memory block is an index to an entry in said memory block ID lookup table, and said entry having at least a starting address of said memory block.

4. A network attached memory device according to claim 3 wherein said means for providing access to a memory location in said memory block by combining said starting address that is associated with said block ID which is part of said virtual address of said memory location and said offset of said virtual address of said memory location.

5. A network attached memory device according to claim 1 wherein said computing device can send a request to said network attached memory device to reserve a second memory block in said memory in said network attached memory device.

6. A network attached memory device according to claim 5 wherein said request includes at least a desired memory size of said second memory block.

7. A network attached memory device according to claim 6 wherein said network attached memory device returns a failure message to said computing device if available memory in said memory is less than said desired memory size at the time of said request.

8. A network attached memory device according to claim 6 wherein said network attached memory device returns at least a partial success message to computing device if available memory in said memory is less than said desired memory size but not empty at the time of said request, and the said available memory is reserved for said computing device.

9. A network attached memory device according to claim 8 wherein said partial success message comprises the size of reserved said second memory block.

10. A network attached memory device according to claim 6 wherein said network attached memory device returns at least a success message to said computing device if available memory in said memory is larger than said desired memory size at the time of said request, and a said second memory block of said desired size is reserved for said computing device.

11. A network attached memory device according to claim 10 wherein said success message comprises the desired size.

12. A network attached memory device according to claim 1 wherein said computing device sends an access request to a memory location in said network attached memory device by sending at least said virtual address of said memory location to the said network attached memory device.

13. A network attached memory device according to claim 1 wherein said memory block has a backup block in said network attached memory device, and the content of said memory block can be copied from or to said backup block.

14. A network attached memory device according to claim 13 wherein said backup block is a second memory block in said network attached memory device.

15. A network attached memory device according to claim 13 wherein said network attached memory device further comprises a non-volatile storage, and said backup block is a storage block in said non-volatile storage.

16. A network attached memory device according to claim 13 wherein said network attached memory device further comprises a backup lookup table, and said backup block has an associated entry in said block lookup table.

17. A network attached memory device according to claim 16 wherein said associated entry comprises at least block ID of said memory block, a starting address of said backup block and a size of said backup block.

18. A network attached memory device according to claim 1 wherein said memory block has a backup block in a second network attached device, and the content of said memory block can be copied from or to said backup block in said second network attached device.

19. A network attached memory device according to claim 18 wherein said network attached memory device further comprises a backup lookup table, and said backup block has an associated entry in said backup lookup table.

20. A network attached memory device according to claim 19 wherein said associated entry comprises at least block ID of said memory block, a starting address of said backup block and a size of said backup block.

21. A memory service architecture comprising:
   a first network attached memory device having first memory, having first device ID, said first device ID is a first index to a first entry in a device ID lookup table, and said first memory comprises at least a first memory block having a first block ID; and
   a second network attached memory device having second memory, having second device ID, said second device ID is a second index to a second entry in said device ID lookup table, and said second memory comprises at least a second memory block having a second block ID; and
   said first network attached memory device and said second network attached memory device are connected to a network;
   wherein said first and second network attached memory devices provide to a separate computing device access said first memory and said second memory through said network connection, and a first memory location in said first memory block having a first virtual address comprising said first device ID, said first block ID and a first offset in said first memory block; and a second memory location in said second memory block having a second virtual address comprising said second device ID, said second block ID and a second offset in said second memory block.

22. A memory service architecture according to claim 21 further comprising a service dispatch function which has a said device ID lookup table and dispatches memory access requests from said separate computing device to said first or said second network attached memory devices.

23. A memory service architecture according to claim 22 wherein said service dispatch function resides on said first network attached memory device.

24. A memory service architecture according to claim 21 wherein said first entry comprises at least network connection information to said first network attached memory device, and said second entry comprises at least network connection information to said second network attached memory device.

25. A memory service architecture according to claim 21 wherein said separate computing device has a said device ID lookup table.

26. A memory service architecture according to claim 21 wherein said separate computing device sends a first access request to said first network attached memory device by sending at least first virtual address of a first targeting memory location in said first network attached memory device.

27. A memory service architecture according to claim 21 wherein said first memory block has a first backup block.

28. A memory service architecture according to claim 27 wherein said first backup block is a third memory block in said first network attached memory device or in said second network attached memory device.

29. A memory service architecture according to claim 27 wherein said first network attached memory device further comprises a first hard disk, and said first backup block is a storage block in said first hard disk.

30. A memory service architecture according to claim 27 wherein said second network attached memory device further comprises a second hard disk, and said first backup block is a storage block is said second hard disk.

* * * * *